(12) United States Patent
de Hoog et al.

(10) Patent No.: US 11,121,577 B2
(45) Date of Patent: Sep. 14, 2021

(54) SATISFYING BUILDING ENERGY DEMAND USING MOBILE ENERGY STORAGE

(71) Applicant: INTERNATIONAL BUSINESS MACHINES CORPORATION, Armonk, NY (US)

(72) Inventors: Julian de Hoog, Eaglemont (AU); Fatemeh Jalali, Hawthorn East (AU); Arun Vishwanath, Blackburn (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 511 days.

(21) Appl. No.: 15/077,235

(22) Filed: Mar. 22, 2016

(65) Prior Publication Data

US 2017/0274780 A1 Sep. 28, 2017

(51) Int. Cl.

| | |
|---|---|
| *G06Q 10/08* | (2012.01) |
| *H04W 16/18* | (2009.01) |
| *B60N 2/02* | (2006.01) |
| *G07C 9/00* | (2020.01) |
| *B60L 53/14* | (2019.01) |
| *H02J 7/34* | (2006.01) |
| *H02J 7/00* | (2006.01) |
| *H02J 7/35* | (2006.01) |
| *B60L 55/00* | (2019.01) |
| *B60L 53/64* | (2019.01) |

(52) U.S. Cl.
CPC .............. *H02J 7/342* (2020.01); *B60L 53/64* (2019.02); *B60L 55/00* (2019.02); *H02J 7/00* (2013.01); *H02J 7/00036* (2020.01); *H02J 7/0063* (2013.01); *H02J 7/35* (2013.01); *H02J 7/00045* (2020.01); *H02J 2007/0067* (2013.01); *H02J 2207/20* (2020.01); *Y02E 10/76* (2013.01)

(58) Field of Classification Search
CPC .... B60L 11/184; B60L 11/1842; B60L 11/18; H02J 7/0054; H02J 7/0063; H02J 2007/0067; H02J 7/00; G06Q 20/00
USPC ................................................ 307/9.1–10.8
See application file for complete search history.

(56) References Cited

U.S. PATENT DOCUMENTS

| | | |
|---|---|---|
| 6,977,479 B2 | 12/2005 | Hsu |
| 7,327,046 B2 | 2/2008 | Biamonte |
| 8,552,581 B2 | 10/2013 | Miller |
| 9,592,742 B1* | 3/2017 | Sosinov ................. B60L 53/126 |
| 2009/0040029 A1* | 2/2009 | Bridges ............. H02J 13/00007 340/12.37 |

(Continued)

FOREIGN PATENT DOCUMENTS

| | | |
|---|---|---|
| WO | 2010042550 | 4/2010 |
| WO | 2012015834 | 2/2012 |

*Primary Examiner* — Brandon S Cole
(74) *Attorney, Agent, or Firm* — Tutunjian & Bitetto, P.C.; Joseph Petrokaitis

(57) ABSTRACT

A mobile energy storage system and a method are provided for supplying power to entities at disparate locations. The system includes a set of vehicles. Each of the vehicles in the set includes a battery set having one or more batteries for storing power. Each of the vehicles in the set further includes a power connector having an end connected to the battery set and another end for connecting to a power transfer switch at the entities. The system also includes a central server for scheduling vehicles in the set to provide power to the entities responsive to energy charging requests issued by the entities.

19 Claims, 7 Drawing Sheets

(56) References Cited

U.S. PATENT DOCUMENTS

| | | | |
|---|---|---|---|
| 2011/0204720 A1* | 8/2011 | Ruiz | B60L 53/14 |
| | | | 307/66 |
| 2012/0005031 A1* | 1/2012 | Jammer | B60L 53/305 |
| | | | 705/16 |
| 2012/0152718 A1* | 6/2012 | Grumel | H01H 1/2058 |
| | | | 200/5 B |
| 2012/0271758 A1* | 10/2012 | Jammer | G07F 15/005 |
| | | | 705/39 |
| 2014/0327405 A1* | 11/2014 | Carkner | B60L 53/57 |
| | | | 320/128 |
| 2015/0149221 A1* | 5/2015 | Tremblay | G06Q 10/02 |
| | | | 705/5 |
| 2015/0300321 A1* | 10/2015 | Haar | F03D 13/22 |
| | | | 206/223 |
| 2016/0311338 A1* | 10/2016 | Klapper | B60L 11/1842 |
| 2016/0339791 A1* | 11/2016 | Sim | H02J 50/90 |
| 2017/0088001 A1* | 3/2017 | Haas | B60L 11/1844 |
| 2017/0136881 A1* | 5/2017 | Ricci | B60L 5/005 |
| 2017/0274780 A1* | 9/2017 | de Hoog | H02J 7/00036 |
| 2018/0072177 A1* | 3/2018 | Tremblay | G06Q 50/12 |

* cited by examiner

SATISFYING BUILDING ENERGY DEMAND USING MOBILE ENERGY STORAGE

BACKGROUND

Technical Field

The present invention generally relates to energy systems, and more particularly to satisfying building energy demand using mobile energy storage.

Description of the Related Art

Battery storage is needed to arbitrage between demand and supply (e.g., to charge the battery from the grid when, e.g., the price of electricity is low, and use the battery during peak periods). Moreover, battery storage is needed to store renewable energy (e.g. solar, wind) when they are available and use the energy from the battery when, e.g., the price of electricity from the grid is high.

Current battery storage systems typically suffer from a number of deficiencies, which limit their use in satisfying building energy demand. For example, current battery storage systems require a high capital investment. Moreover, current battery storage systems are underutilized, as they are typically employed to reduce excess peak demand. Also, current battery storage systems are stationary, thus limiting their use and applications. They are often housed in a building and are therefore static, and so they cannot "space shift" energy. Thus, there is a need to satisfy building energy demand using mobile energy storage.

SUMMARY

According to an aspect of the present principles, a mobile energy storage system is provided for supplying power to entities at disparate locations. The system includes a set of vehicles. Each of the vehicles in the set includes a battery set having one or more batteries for storing power. Each of the vehicles in the set further includes a power connector having an end connected to the battery set and another end for connecting to a power transfer switch at the entities. The system also includes a central server for scheduling vehicles in the set to provide power to the entities responsive to energy charging requests issued by the entities.

According to another aspect of the present principles, a method is provided for supplying mobile energy to entities at disparate locations. The method includes configuring a set of vehicles to each include a battery set having one or more batteries for storing power. The method further includes configuring the set of vehicles to each include a power connector having an end connected to the battery set and another end for connecting to a power transfer switch at the entities. The method also includes configuring a central server to schedule vehicles in the set to provide power to the entities responsive to energy charging requests issued by the entities.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to satisfying building energy demand using mobile energy storage. Thus, in an embodiment, the present principles enable both "time and space shifting" of energy.

The present principles improve battery efficacy through a shared approach. For example, in an embodiment, the effectiveness of battery storage is enhanced by sharing the battery across different premises and/or applications.

In an embodiment, energy distribution from location A to location B is provided using an intelligent system that matches energy demand and energy resources. In an embodiment, the intelligent system is enabled using different form-factor vehicles that carry all necessary infrastructure (e.g., batteries, inverters, power cables, and so forth). The vehicles can be traditional vehicles (e.g., seen today) or future autonomous vehicles that operate without human intervention. In an embodiment, the vehicles use a smart navigation system and cameras to identify desired locations for parking, and so forth. For illustrative purposes, the present principles are hereinafter described with respect to autonomous vehicles, it is to be appreciated that the present principles are not limited to autonomous vehicles and can be used with traditional vehicles operated by a human. These and other variations of the present principles are readily contemplated by one of ordinary skill in the art given the teachings of the present principles provided herein, while maintaining the spirit of the present principles.

Figure 1:
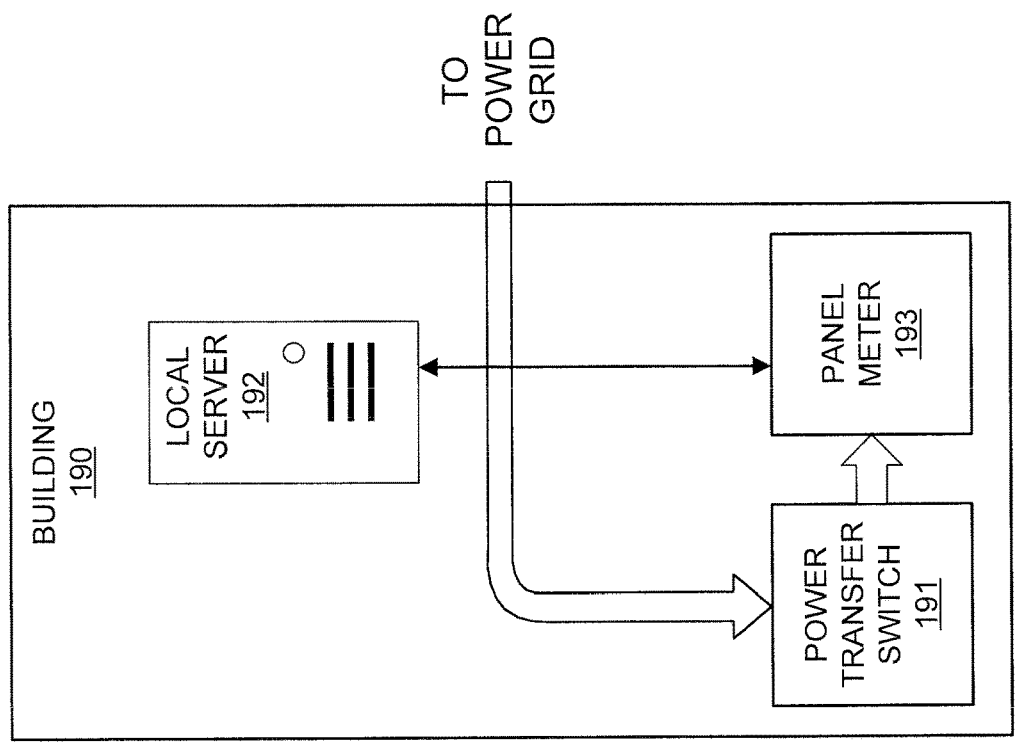
FIG. 1 shows an exemplary mobile energy system 100, in accordance with an embodiment of the present principles.
Figure 1:
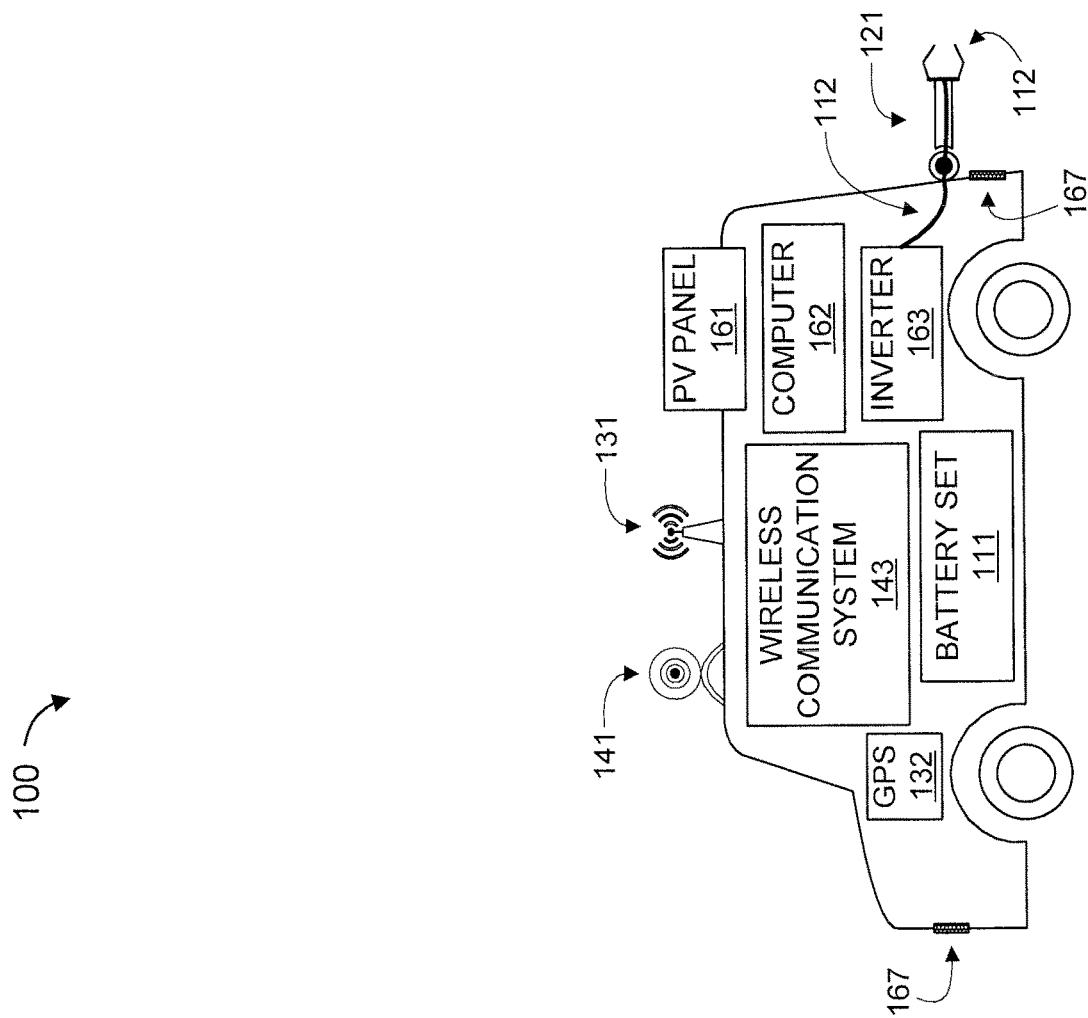
Figure 2:
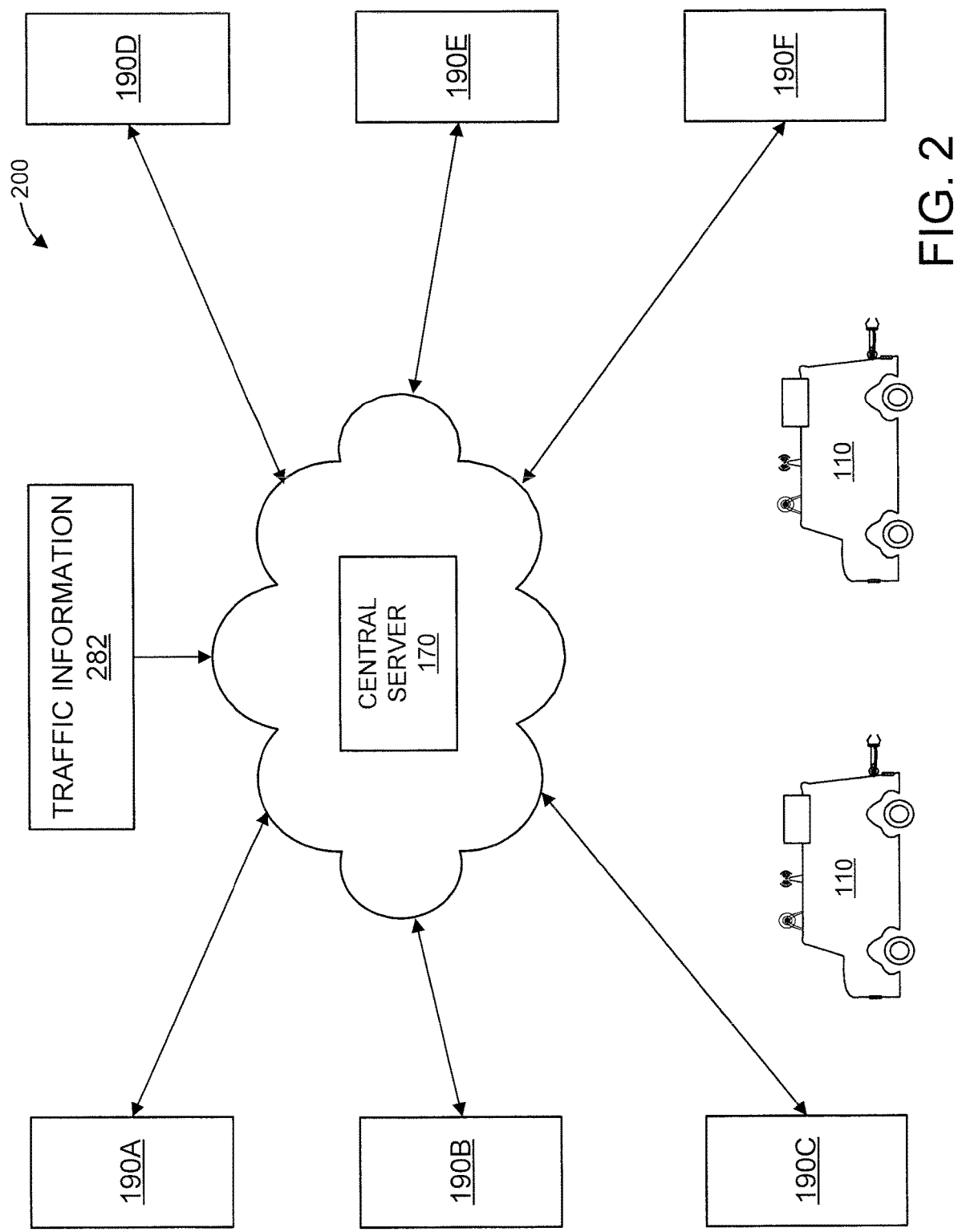
FIG. 2 shows an exemplary operating environment 200 to which the present principles can be applied, in accordance with an embodiment of the present principles.

FIG. 1 shows an exemplary mobile energy system 100, in accordance with an embodiment of the present principles. FIG. 2 shows an exemplary operating environment 200 to which the present principles can be applied, in accordance with an embodiment of the present principles.

The mobile energy system 100 is used to supply one or more entities (in this example, buildings 190) with power. While one entity (i.e., buildings 190) is shown in FIG. 1 for the sakes of illustration and brevity, the mobile energy system 100 can readily supply power to any number of one or more entities (with multiple entities shown in FIG. 2) due to its mobility. For the sake of illustration, reference numeral 190 can refer to the term building in singular and plural form.

The mobile energy system 100 involves a vehicle 110 to supply the power to the building 190 (other entity). The vehicle 110 is equipped with a battery set 111 and a power connector 112.

The battery set 111 includes one or more batteries for storing power.

In the embodiment of FIG. 1, the power connector 112 has two ends, with each end having two terminals. The power connector 112 is connected to the battery set 111 at one end and to a power transfer switch 191 in the building 190 at the other end during operation. During transit or other times, the power connector 112 is disconnected from at least the power transfer switch 191. The power connector 112 can be capped at one or both ends to prevent short circuiting. While a two-ended connector 112 is described herein, other connectors providing more connections at either end can also be used in accordance with the teachings of the present principles, while maintaining the spirit of the present principles.

In an embodiment, a robotic cable arm 121 is used to connect the power connector 112 to the power transfer switch 191. In an embodiment, the power connector 112 can be incorporated into the robotic cable arm 121 (e.g., as shown in FIG. 1, where the end of the power connector 112 that connects to the power transfer switch 191 is incorporated at the ends of the robotic cable arm 121 such that the robotic cable arm 121 simply makes contact with the power transfer switch 191 in order to make an electrical connection therewith). Of course, other configurations and implementations can also be used given the teachings of the present principles provided herein, while maintaining the spirit of the present principles. In an embodiment, the connections can be made by a human.

The building 190, in addition to the aforementioned power transfer switch 191, further includes a local server 192 and a panel meter 193.

The local server 192 controls the power transfer switch 191. The power transfer switch 191 is operated (controlled) so as to typically receive power from the power grid, and can switch to the battery set 111 during certain times and/or under certain conditions, based on user need, user requirements, and so forth.

The panel meter 193 monitors the use of power. In an embodiment, the panel meter 193 is in signal communication with the local server 192.

In an embodiment, the vehicle 110 is an autonomous vehicle having an antenna 131 and a Global Positioning System navigation system 132 for locating the entity(ies) (e.g., building(s)) to which power is to be supplied.

In an embodiment, the vehicle 110 includes a camera 141 and computer processing system 162 for vehicle navigation, finding suitable parking for the vehicle 110 and for precisely locating the power transfer switch 191 in order to connect the robotic cable arm 121 to the power transfer switch 191. For example, the camera 141 can be helpful in situations where the GPS navigation system 132 is inoperable, such as basements and so forth. Moreover, sensors 167 such as proximity sensors can be used to aid in mobility and parking functions of the vehicle 190, as well as for locating/connecting the power connector 112 to the power transfer switch 191.

The antenna 131 and a wireless communication system 143 can be used to communicate with a central server 170 described in further detail hereinafter. In an embodiment, the wireless communication system 143 can be implemented by the computer processing system 162. In an embodiment, the antenna 131 can be included in the wireless communication system 143. Other arrangements can also be used given the teachings of the present principles provided herein, while maintaining the spirit of the present principles.

In an embodiment, the vehicle 110 further includes a solar photovoltaic (PV) panel 161 for powering on-board electronics such as, but not limited to, an on-board computer processing system (hereinafter "computer" in short) 162 that controls charging of the battery set 111, the robotic control cable arm 121, and so forth. In an embodiment, the photovoltaic panel 161 can also be used to charge the battery set 111. For the sake of clarity in the FIG. 1, not all wired connections are shown, but are readily apparent to one of ordinary skill in the art, given the teachings of the present principles provided herein.

In an embodiment, the vehicle 110 also includes an inverter 163 for converting DC power (from the battery set 111) to AC power (for use by the building 190).

The mobile energy system 100 further includes a central server 170. In an embodiment, the central server 170 is implemented in the cloud. Of course, non-cloud based implementations of the central server 170 can also be used in accordance with the teachings of the present principles, while maintaining the spirit of the present principles.

In an embodiment, the central server 170 outputs assignments of mobile energy storage vehicles to buildings (or specific sites) to satisfy the energy demand as per the policy of each building. This can be accomplished using scheduling algorithms such as fair scheduling (to ensure that all mobile storage entities get an opportunity to supply energy), round robin (schedule one storage entity after another), location dependent (vehicles closest to the building is assigned to supply energy), or in response to some price bidding functions that accounts for the cost of supplying energy from the mobile energy storage assets. Of course, the present principles are not limited to the preceding scheduling approaches and can thus use other scheduling approaches, while maintaining the spirit of the present principles. Thus, the central server 170 acts as a scheduler and dispatcher for the vehicles.

In an embodiment, the respective on-board computer processing system 162 in each vehicle 110 communicates with the central server 170 to provide the following information to the central sever 170, which can include, but is not limited to: a location of the vehicle; energy availability; and cost information.

In an embodiment, the respective local server 192 in each building issues an energy request to the central server 170, which can then schedule one or more vehicles 190 to go to a building in response to an energy request in order to supply battery power to the building 190.

To assist in its scheduling functions, the central server 170 can receive traffic information 282 in order to determine optimized routes for the vehicles 190. In an embodiment, the vehicles 190 themselves can receive such traffic information to determine a route or adjust a route.

Referring to FIG. 2, the environment 200 includes multiple buildings 190A, 190B, 190C, 190D, 190E, and 190F (hereinafter interchangeably "190A-F"), which communicate with the central server 170.

The buildings 190A-F send energy requests to the central server 170 that include data used by the central server 170 to schedule the vehicles 110 (shown in FIG. 1) to power the buildings 190A-F. The central server then schedules the vehicles 110 using such data.

The operations of these elements in accordance with the present principles is described in further detail below with respect to FIGS. 3 and 4.

Figure 3:
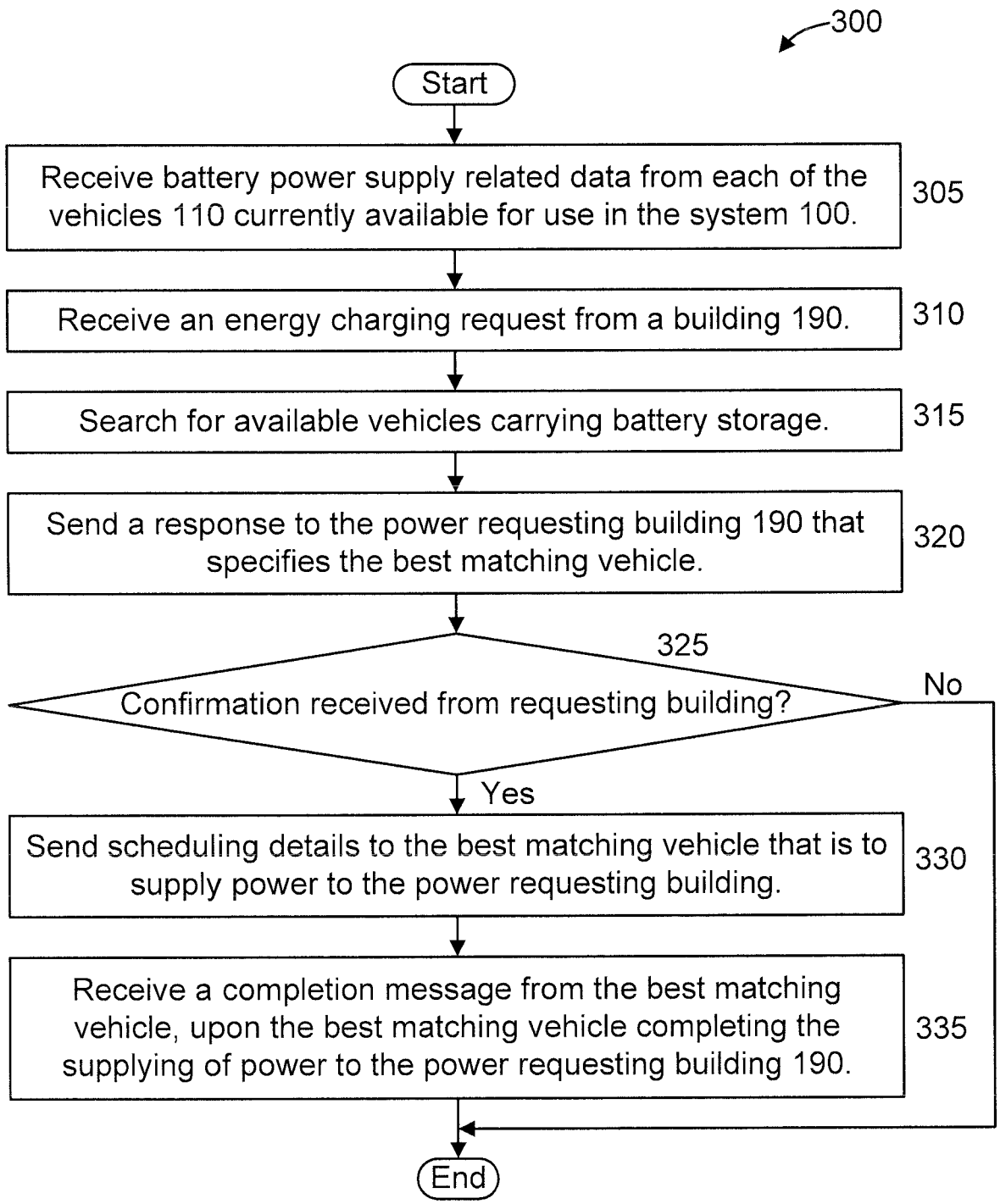
FIG. 3 shows an exemplary method 300 for mobile energy storage use, in accordance with an embodiment of the present principles.

FIG. 3 shows an exemplary method 300 for mobile energy storage use, in accordance with an embodiment of the present principles. The method 300 is performed by the central server 170.

At step 305, receive battery power supply related data from each of the vehicles 110 currently available for use in the system 100.

The battery power supply related data includes data relating to supplying battery power by a vehicle. The battery power supply related data can include, but is not limited to, vehicle location, energy availability, and cost. The cost can be an energy cost that can factor in multiple parameters, such as the worth (e.g., but not limited to, market price) of the energy, the cost of getting it to a given building (which can involve a cars Miles Per Gallon (MPG) rating, and so forth, since the actual cost of getting to a given building will ultimately depend on the location of the vehicle and the location of the building when the latter becomes known), and so forth. It is to be appreciated that step 305 can be performed periodically, randomly, or on some other basis, so as to provide the central server 170 with information about the vehicles in order for the information to be used to determine which vehicle(s) is/are a best match to a given power request as described hereinafter.

At step 310, receive an energy charging request (hereinafter "energy request" in short) from a building 190 (hereinafter "power requesting building"). The energy request can be received, for example, through any of a mobile application, a website, a message, an email, and so forth. In an embodiment, the energy request includes a start time (at which it is desired for the supplying of energy to commence), a duration (of the supplying of energy), and an amount of energy required.

At step 315, search for available vehicles carrying battery storage. The search can be based on the information received at step 305. In an embodiment, multiple intermediate search results, each based on a given parameter (e.g., energy amount, distance, cost, and so forth), can be synthesized to arrive at the final top N vehicles or a single best vehicle. Techniques such as averaging and so forth can be used to synthesize multiple search results into the final search result. For the purpose of illustration and brevity, the example of FIG. 3 will employ a single best vehicle in the search result (hereinafter referred to as "best matching vehicle"), again emphasizing that more than one vehicle can be included in the search result, depending upon the implementation and system configuration.

For example, regarding energy amount, vehicles not having enough energy can be excluded from the search result if other vehicles have enough energy. Conversely, all or the top N (where N is an integer) vehicles having enough energy can be included in an intermediate or final search result.

For distance (between vehicles and the requesting building 190), the top N vehicles based on closeness can be included in an intermediate or final search result.

For cost, the top N vehicles associated with the least cost can be included in an intermediate or final search result.

Other parameters can also be employed in the search as readily appreciated by one of ordinary skill in the art given the teachings of the present principles provided herein, while maintaining the spirit of the present principles.

At step 320, send a response to the power requesting building 190 that specifies the best matching vehicle.

At step 325, determine whether a confirmation of the request is received from the requesting building. If so, then proceed to step 330. Otherwise, terminate the method.

In an embodiment, the confirmation confirms the use of the best matching building, either explicitly or implicitly. In another embodiment, the confirmation can specify a particular one of one or more best matches of vehicles in the case where more than one vehicle is specified in the response sent at step 320. In yet another embodiment, in an absence of specifying a particular one, the ultimate best match (closest match, based on pre-specified criteria including, but not limited to, distance, available power, cost and so forth) is presumed to be selected as a default configuration. Of course, other configurations involving other ways of selecting can also be used.

At step 330, send scheduling details to the best matching vehicle that is to supply power to the power requesting building.

At step 335, receive a completion message from the best matching vehicle, upon the best matching vehicle completing the supplying of power to the power requesting building 190.

Figure 4:
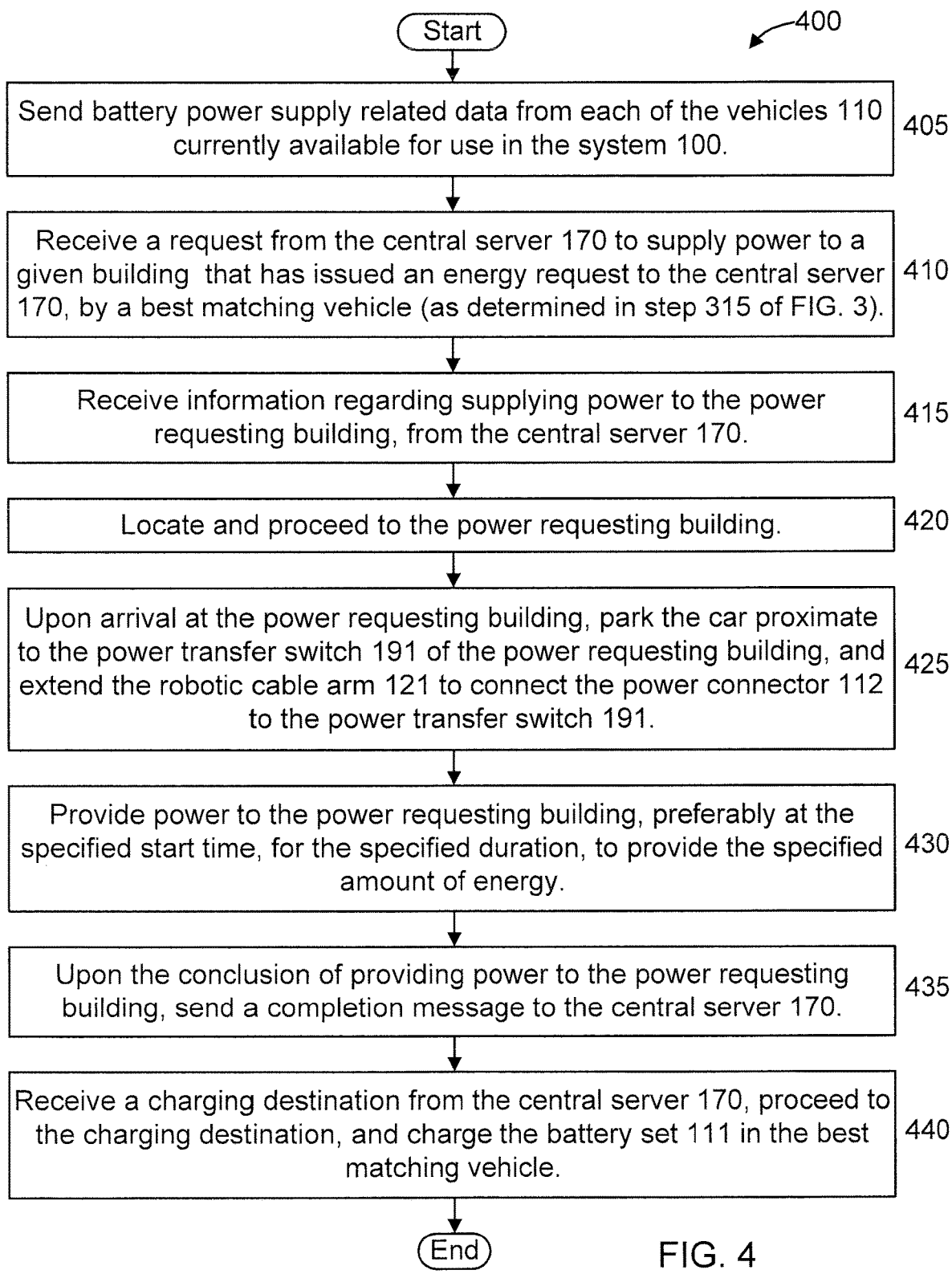
FIG. 4 shows an exemplary method 400 for mobile energy storage use, in accordance with an embodiment of the present principles.

FIG. 4 shows an exemplary method 400 for mobile energy storage use, in accordance with an embodiment of the present principles. The method 400 is performed by the vehicles that supply mobile energy to the buildings.

At step 405, send battery power supply related data from each of the vehicles 110 currently available for use in the system 100. Such battery power supply related data is described hereinabove with respect to step 305 of FIG. 3.

At step 410, receive a request from the central server 170 to supply power to a given building (hereinafter interchangeably referred to as "power requesting building") that has issued an energy request to the central server 170, by a best matching vehicle (as determined in step 315 of FIG. 3). The request can include information including, but not limited to, building location, amount of power needed, start time (for supplying power), duration (for supplying power), and so forth. The present principles are not limited to the preceding information and, thus, other information can also be included depending upon the implementation.

At step 415, receive information regarding supplying power to the power requesting building, from the central server 170. The information can include the building location, the amount of power needed, the start time, the duration, and so forth.

At step 420, locate and proceed to the power requesting building.

At step 425, upon arrival at the power requesting building, park the car proximate to the power transfer switch 191 of the power requesting building, and extend the robotic cable arm 121 to connect the power connector 112 to the power transfer switch 191.

At step 430, provide power to the power requesting building, preferably at the specified start time, for the specified duration, to provide the specified amount of energy.

At step 435, upon the conclusion of providing power to the power requesting building, send a completion message to the central server 170.

At step 440, receive a charging destination (e.g., a photovoltaic charging farm, and so forth) from the central server 170, proceed to the charging destination, and charge the battery set 111 in the best matching vehicle.

The method can be performed for other vehicle concurrently or simultaneously, and can be repeated for a vehicle that has already provided power (which may have been charged in the interim depending upon its capacity and available energy amount left of the initial charging(s)).

As noted above, various embodiments of the present principles are described with respect to autonomous vehicles. However, the present principles are not limited to the same, and can involve traditional vehicles driven by human operators. Nonetheless, it is noted that some of the advantages in using autonomous vehicles include, for example, but are not limited to, the following: (i) self-driving, without human intervention; (ii) can be given a destination address (e.g. by apps); (iii) can find the path (e.g.

by GPS); (iv) can find a parking spot by sensors and cameras; (v) can be used for space-shifting and time-shifting energy via the battery set; and (vi) do not transport people (thus removing human driver costs from consideration and having more space to accommodate battery packs because the seats can be removed).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
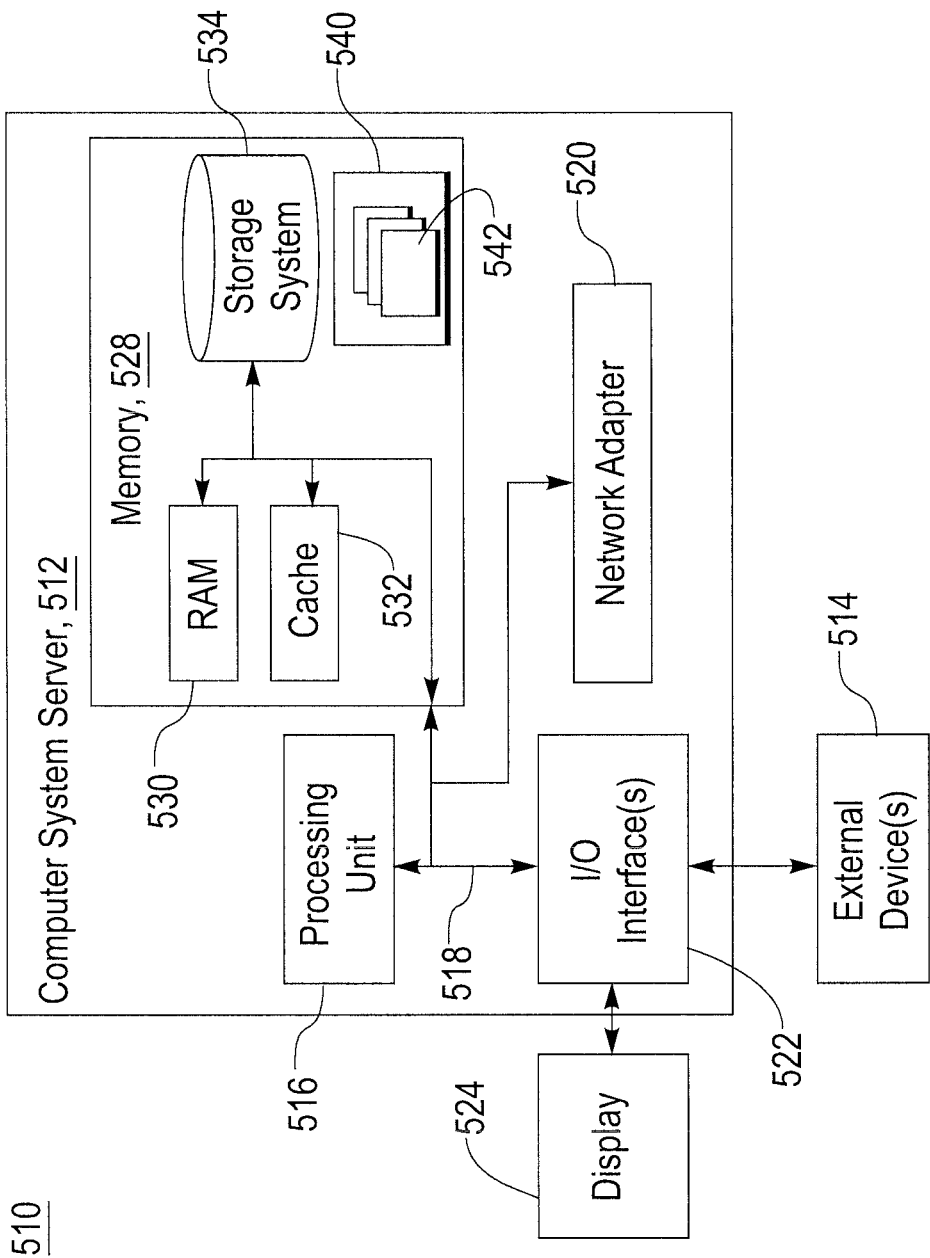
FIG. 5 shows an exemplary cloud computing node 510, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
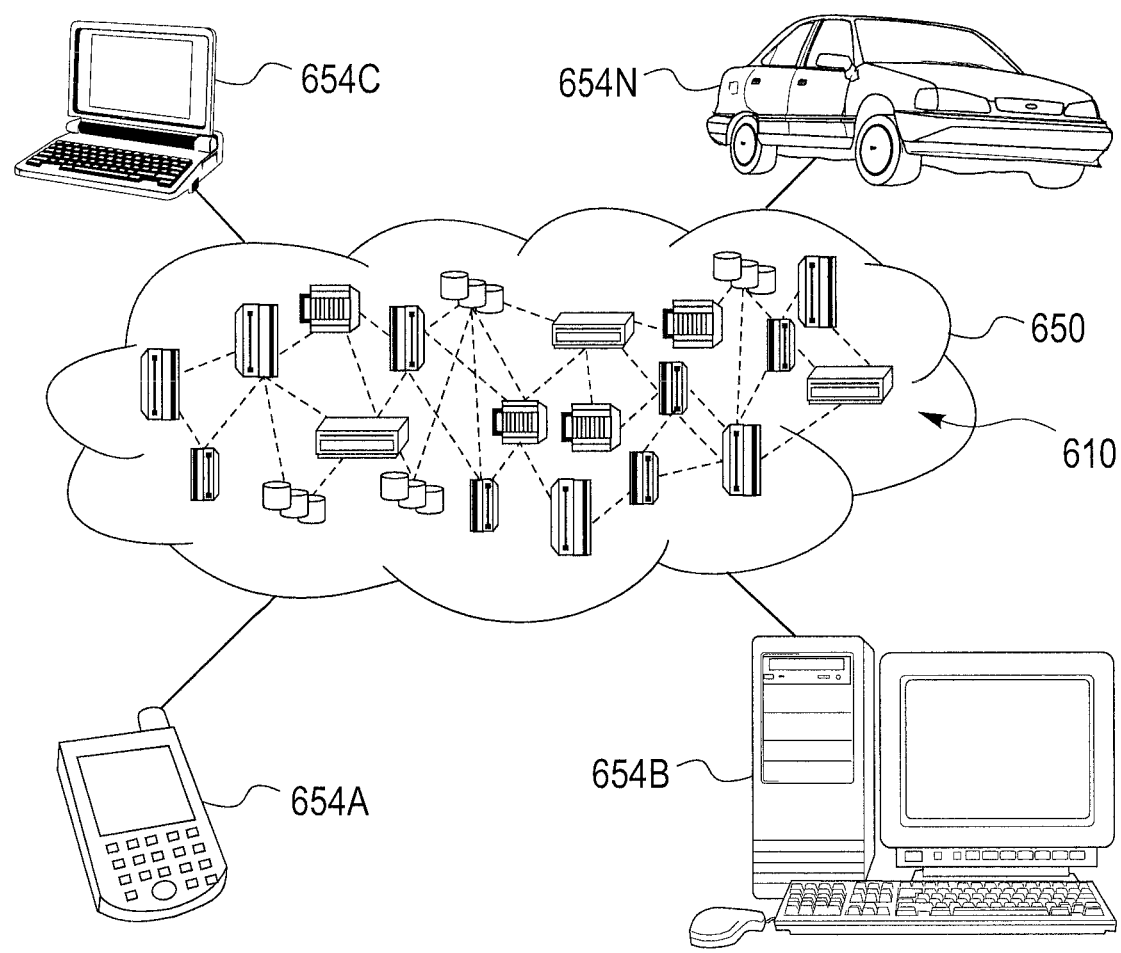
FIG. 6 shows an exemplary cloud computing environment 650, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
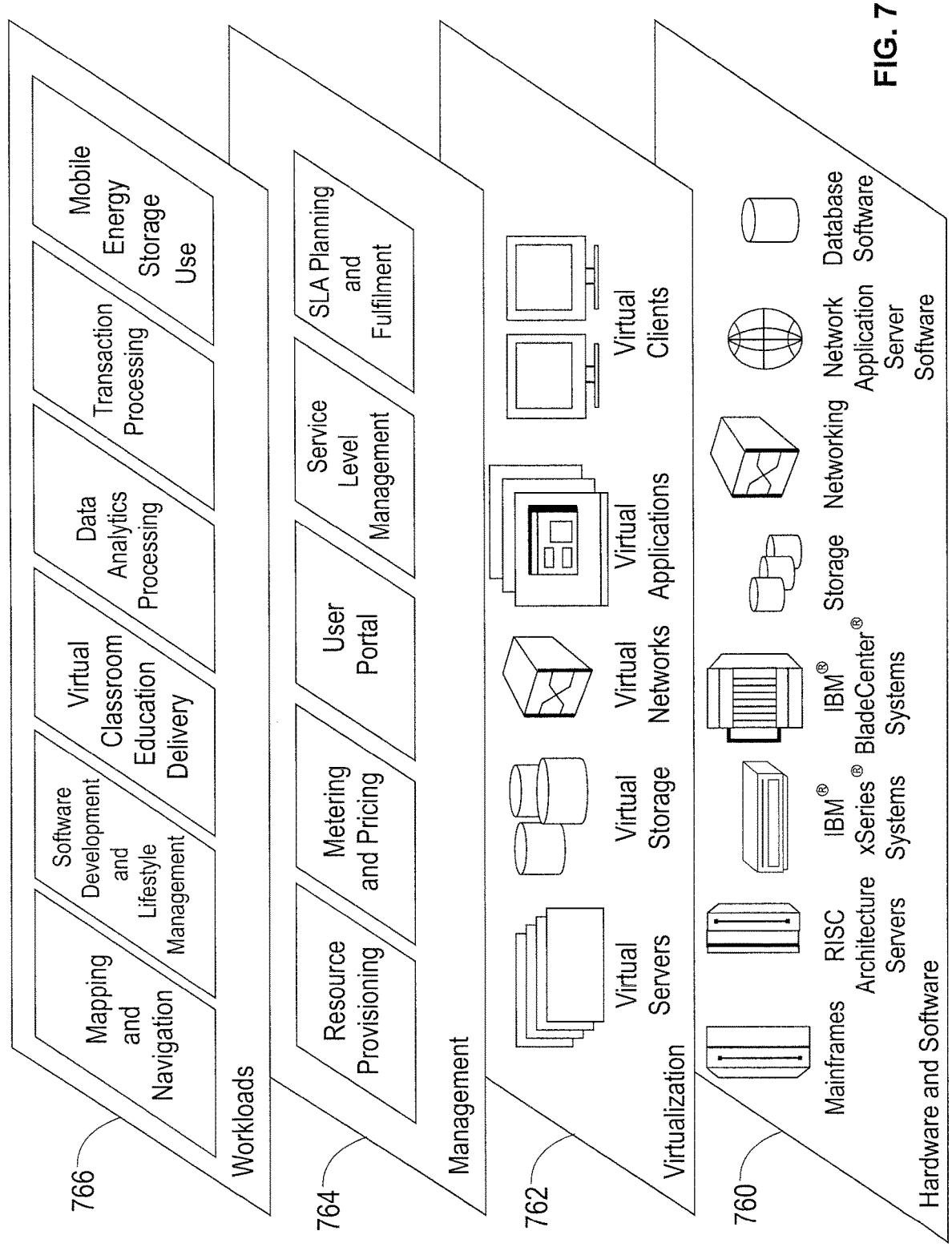
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile energy storage use.

Thus, in an embodiment, battery storage system utilization is improved by sharing to meet the respective demands of different entities (e.g., residential building, commercial building, etc.) involving different structures (e.g., buildings). The present principles are particularly suitable for entities having different demand profiles (e.g., households and commercial buildings). In this way, the present principles assist such entities to adopt greener energy. Moreover, the present principles can assist in emergency situations. For example, in villages in India as well as other locations, there is intermittent electricity and energy is needed in a rather ad hoc manner. The present principles can readily be applied to such a scenario. Additionally, the present principles add mobility to a battery storage system, thus significantly increasing its efficacy. These and other applications/scenarios to which the present principles can be applied, as well as other attendant advantages of the present principles, are readily contemplated by one of ordinary skill in the art given the teachings of the present principles provided herein, while maintaining the spirit of the present principles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A mobile energy storage system for supplying power to buildings at disparate locations, the system comprising:
    a set of autonomous charging road vehicles, each including:
        a battery set having one or more batteries for storing power; and
        a power connector having an end connected to the battery set and another end for connecting to a power transfer switch at the buildings; and
    a central server for scheduling autonomous charging road vehicles in the set to provide power to the buildings responsive to energy charging requests issued by the buildings and respective vehicle criteria regarding a best matching one of the autonomous charging road vehicles in the set capable of filling the energy charging requests at respective building specified times, the respective vehicle criteria comprising vehicle-to-building distances, costs to provide the power to the buildings, and an energy amount to fulfill the request.

2. The system of claim 1, further comprising:
    a camera operatively coupled to a computer system for precisely locating the power transfer switch; and
    a road-vehicle-based robotic arm to connect the other end of the power connector to the power transfer switch without user intervention at pre-specified times and for pre-specified durations in the energy charging requests.

3. The system of claim 2, wherein the power connector is comprised within at least part of the road-vehicle-based robotic arm.

4. The system of claim 1, further comprising a Global Positioning System navigation system for locating the buildings to which power is to be supplied.

5. The system of claim 4, further comprising a camera and computer processing system for locating the power transfer switch and connecting the other end of the power connector to the power transfer switch.

6. The system of claim 1, further comprising proximity sensors for locating the power transfer switch and connecting the other end of the connector to the power transfer switch.

7. The system of claim 1, further comprising a solar panel for at least one of charging the battery set and powering on-board vehicle electronics.

8. The system of claim 1, further comprising an inverter for connecting Direct Current power from the battery set to Alternating Current for use by the buildings.

9. The system of claim 1, wherein the central server is implemented in a cloud configuration.

10. The system of claim 1, wherein at least two of the buildings have disparate energy charging requirements.

11. The system of claim 1, wherein the central server schedules autonomous charging road vehicles in the set using price bidding dependent scheduling.

12. The system of claim 1, wherein the central server receives traffic information, and schedules the autonomous charging road vehicles in the set using the traffic information.

13. The system of claim 1, wherein each of the autonomous charging road vehicles receives traffic information and modifies its path to a given one of the buildings using the traffic information.

14. The system of claim 1, wherein each of the buildings further comprises, in addition to the power transfer switch:
- a building-stationary panel meter for monitoring power usage; and
- a building-stationary local server for controlling the power transfer switch and for issuing the energy charging requests.

15. The system of claim 14, wherein the power transfer switch at each of the buildings is configured to receive power from a power grid, and switch to battery power at at least one of particular times and under particular conditions.

16. The system of claim 14, wherein the particular times are dynamically variable.

17. The system of claim 1, further comprising returning to a photovoltaic charging farm to charge the best matching one of the autonomous charging road vehicles at a conclusion of charging to refresh a charge level of the best matching one of the autonomous charging road vehicles.

18. The system of claim 1, wherein in an absence of specifying a specific one of the autonomous charging road vehicles, use of the best matching one of the autonomous charging road vehicles is a default configuration automatically selected.

19. A method for supplying mobile energy to buildings at disparate locations, the method comprising:
- configuring a set of autonomous charging road vehicles to each include:
  - a battery set having one or more batteries for storing power; and
  - a power connector having an end connected to the battery set and another end for connecting to a power transfer switch at the buildings; and
- configuring a central server to schedule autonomous charging road vehicles in the set to provide power to the buildings responsive to energy charging requests issued by the buildings and respective vehicle criteria regarding a best matching one of the autonomous charging road vehicles in the set capable of filling the energy charging requests at respective building specified times, the respective vehicle criteria comprising vehicle-to-building distances, costs to provide the power to the buildings, and an energy amount to fulfill the request.

* * * * *